US012630123B2

(12) United States Patent
Shi

(10) Patent No.: US 12,630,123 B2
(45) Date of Patent: May 19, 2026

(54) AUTOMATIC CAR WASHING DEVICE AND AUTOMATIC CAR WASHING METHOD THEREFOR

(71) Applicant: Zhejiang Yigoli Intelligent Technology Co., Ltd., Hangzhou (CN)

(72) Inventor: Hengzhi Shi, Hangzhou (CN)

(73) Assignee: Zhejiang Yigoli Intelligent Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/350,085

(22) Filed: Jul. 11, 2023

(65) Prior Publication Data

US 2023/0356698 A1 Nov. 9, 2023

(30) Foreign Application Priority Data

Feb. 17, 2023 (CN) .......................... 202310126755.5

(51) Int. Cl.
| | |
|---|---|
| *B60S 3/04* | (2006.01) |
| *B08B 3/02* | (2006.01) |
| *B08B 13/00* | (2006.01) |

(52) U.S. Cl.
CPC ................ *B60S 3/04* (2013.01); *B08B 3/024* (2013.01); *B08B 13/00* (2013.01); *B08B 2203/0217* (2013.01); *B08B 2203/0282* (2013.01)

(58) Field of Classification Search
None
See application file for complete search history.

(56) References Cited

U.S. PATENT DOCUMENTS

| | | | | |
|---|---|---|---|---|
| 3,595,250 | A | * | 7/1971 | Hurst ........................ B60S 3/04 |
| | | | | 118/704 |
| 2004/0079402 | A1 | | 4/2004 | Shin |

(Continued)

FOREIGN PATENT DOCUMENTS

| | | | |
|---|---|---|---|
| CN | 108860075 | * | 11/2018 |
| CN | 109887190 | * | 6/2019 |

(Continued)

OTHER PUBLICATIONS

Translation of KR20200018102 by Kim, published Feb. 19, 2020.*

(Continued)

*Primary Examiner* — Kaj K Olsen
*Assistant Examiner* — Ryan L Coleman
(74) *Attorney, Agent, or Firm* — Hemisphere Law, PLLC

(57) ABSTRACT

The present invention provides an automatic car washing device and an automatic car washing method therefor. The automatic car washing device includes a guide rail device and a cleaning rack arranged on the guide rail device. The automatic car washing method includes: acquiring a car washing instruction, moving a cleaning rack to a corresponding cleaning position based on the car washing instruction, and opening a corresponding water sprayer and/or a corresponding car washing shampoo sprayer in sequence based on the car washing instruction, and keeping same operating for set cleaning duration, and keeping unopened water sprayers and/or car washing shampoo sprayers closed. The present invention solves a problem of a poor cleaning effect due to incapacity of a sprinkler of an existing automatic car washing device to produce enough spray pressure, improves diversity of car washing modes, and greatly reduces car washing costs.

17 Claims, 12 Drawing Sheets

(56) References Cited

U.S. PATENT DOCUMENTS

| | | |
|---|---|---|
| 2005/0133071 A1 | 6/2005 | Brady |
| 2008/0229531 A1 | 9/2008 | Takida |
| 2022/0048478 A1* | 2/2022 | McGovern .............. B05B 1/205 |

FOREIGN PATENT DOCUMENTS

| | | | |
|---|---|---|---|
| CN | 114511819 | * | 5/2022 |
| CN | 115158237 | * | 10/2022 |
| DE | 202019103533 | * | 10/2020 |
| KR | 20200018102 | * | 2/2020 |
| RU | 2751257 | * | 7/2021 |

OTHER PUBLICATIONS

Translation of CN109887190 by Fan, published Jun. 14, 2019.*
Translation of CN115158237 by Liu, published Oct. 11, 2022.*
Translation of CN108860075 by Meng, published Nov. 23, 2018.*
Translation of DE202019103533 by Christ, published Oct. 7, 2020.*
Translation of CN114511819 by Wang, published May 17, 2022.*
Translation of RU 2751257 of Vladimirovich, published Jul. 12, 2021.*

* cited by examiner

1

45

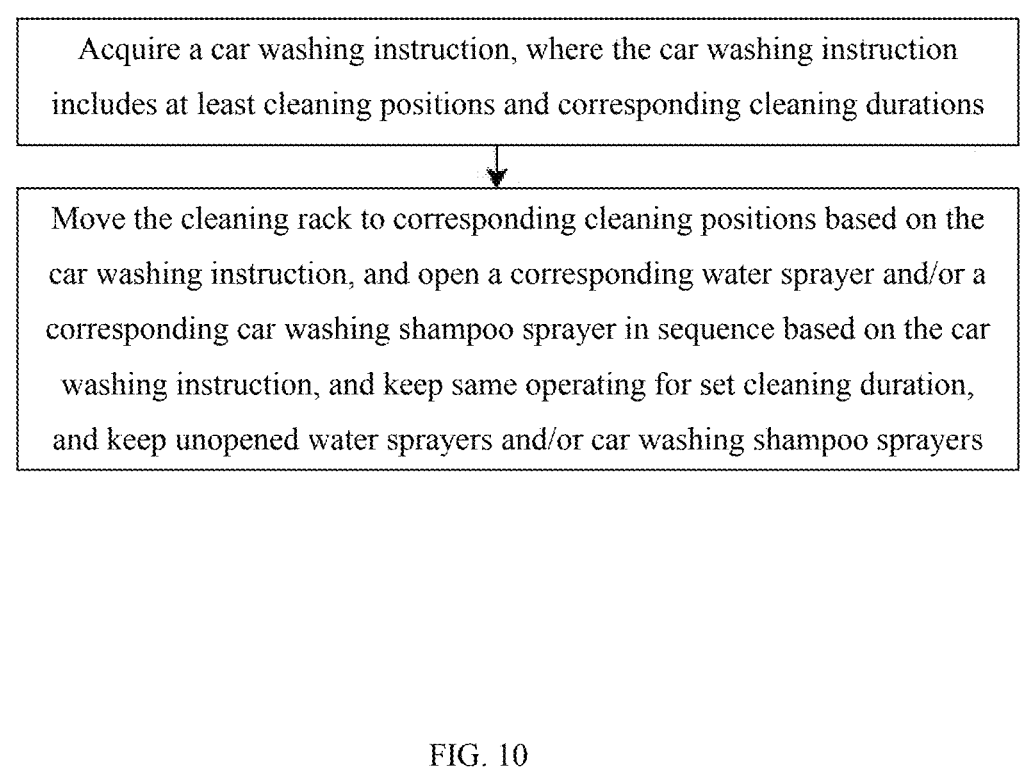

Acquire a car washing instruction, where the car washing instruction includes at least cleaning positions and corresponding cleaning durations Move the cleaning rack to corresponding cleaning positions based on the car washing instruction, and open a corresponding water sprayer and/or a corresponding car washing shampoo sprayer in sequence based on the car washing instruction, and keep same operating for set cleaning duration, and keep unopened water sprayers and/or car washing shampoo sprayers

FIG. 10

AUTOMATIC CAR WASHING DEVICE AND AUTOMATIC CAR WASHING METHOD THEREFOR

TECHNICAL FIELD

The present application relates to the field of unmanned car washing, in particular to an automatic car washing device and an automatic car washing method therefor.

DESCRIPTION OF RELATED ART

With the technological progress, automatic car washing devices are increasingly popular. An existing automatic car washing device is provided with several sprinklers connected to the same water pipe, the water pipe is connected to a booster pump, and a switch valve is mounted on the water pipe. After the switch valve is opened, all the sprinklers connected to the water pipe are opened at the same time, and spray water to clean different positions of a car. After spraying, all the sprinklers on the water pipe are closed simultaneously by closing the switch valve.

The existing automatic car washing device has the following shortcomings: water pressure produced by the booster pump is constant during car washing, and in view of simultaneous opening or closing of the sprinklers, the pressure will be shared by all the sprinklers after they are opened and water in the water pipe is sprayed out of each sprinkler, such that the sprinklers cannot produce high spray pressure, dirt on the car cannot be effectively washed down, and the cleaning effect is poor. To achieve the desirable cleaning effect, increase in the pressure of the booster pump is required, which increases costs of the car washing device inevitably. In addition, the existing automatic car washing device can only open or close the sprinklers at the same time, causing unnecessary waste of water resources, and failures to clean a specific position of the car.

SUMMARY

Embodiments of the present application provide an automatic car washing device and an automatic car washing method, which, may wash a single position of a car, solve a problem of a poor cleaning effect due to incapacity of a sprinkler of an existing automatic car washing device to produce enough spray pressure, improve diversity of car washing modes, and greatly reduce car washing costs.

In a first aspect, the embodiment of the present application provides an automatic car washing device, including a guide rail device and a cleaning rack arranged on the guide rail device, where the washing rack is provided with several independently controlled water sprayers arranged at different positions and several independently controlled car washing shampoo sprayers, the water sprayers are connected in a shared mode to a single water pipe through corresponding switch assemblies, and an end of the single water pipe is connected to a water pump.

In a second aspect, the embodiment of the present application provides an automatic car washing device, including a guide rail device and a cleaning rack arranged on the guide rail device, where the cleaning rack is provided with several independently controlled water sprayers arranged at different positions and several independently controlled car washing shampoo sprayers, a bottom of the cleaning rack is provided with a hub cleaning nozzle, the water sprayers are connected in a shared mode to a single water pipe through corresponding switch assemblies, an end of the single water pipe is connected to a water pump, a hub cleaner delivery device is connected to the hub cleaning nozzle through a supply line, and the supply line and the single water pipe are arranged independently.

In a third aspect, the embodiment of the present application provides an automatic car washing method, including: acquiring a car washing instruction, where the car washing instruction at least includes a cleaning position and corresponding cleaning duration; and moving a cleaning rack to a corresponding cleaning position based on the car washing instruction, and opening a corresponding water sprayer and/or a corresponding car washing shampoo sprayer in sequence based on the car washing instruction, and keeping same operating for set cleaning duration, and keeping unopened water sprayers and/or car washing shampoo sprayers closed.

In a fourth aspect, the embodiment of the present application provides an automatic car washing method, including: acquiring a car washing instruction, where the car washing instruction at least includes a cleaning position and corresponding cleaning duration; moving a cleaning rack to a corresponding cleaning position based on the car washing instruction; under the condition that the cleaning position is a hub, acquiring a car hub image, identifying the hub based on the car hub image by using a hub identification model, and opening a corresponding water sprayer, a corresponding hub cleaning nozzle and/or a corresponding car washing shampoo sprayer in sequence based on the car washing instruction, and keeping same operating for set cleaning duration; and under the condition that a hub cleaning nozzle needs to be opened, moving the hub cleaning nozzle of the cleaning rack to a position where the hub is located, and keeping unopened water sprayers, hub cleaning nozzles and/or car washing shampoo sprayers closed.

Main contributions and innovations of the present invention are as follows:

The embodiments of the present application provide the automatic car washing device and the automatic car washing method. The water sprayers on the cleaning rack of the automatic car washing device are independently controlled, so each water sprayer may be controlled to be opened and closed independently at a single point. When cleaning, a single water sprayer or several specific water sprayers may be opened separately and spray water to clean corresponding part of a car body. By reducing an opening quantity of water sprayers, a remote and high-pressure water spray effect may be achieved with a few of booster pumps, and spray pressure of the single or several specific water sprayers may be improved, such that the corresponding part of the car body may be effectively cleaned, dirt attached to the car body may be effectively washed down, and the cleaning effect may be improved. In addition, the automatic car washing method provides a possibility of a multi-style car washing mode, and satisfies different car washing requirements through user control on the opening and closing of each water sprayer.

In addition, the hub cleaning structure is specially arranged at the position corresponding to the car hub and supported by an intelligent identification method in this solution. After the position of the car hub is identified, the hub is cleaned in a targeted mode by using the special hub cleaning structure, thereby greatly improving car washing quality.

Moreover, the automatic car washing device according to this solution avoids car washing safety accidents in unmanned car washing scenarios through an active safety mode and a passive safety mode. In this solution, active and safe avoidance is implemented by monitoring a distance of a to-be-washed car in real time, and by monitoring a state of a drive structure, timely feedback measures are taken to a structure vulnerable to loss, so as to avoid unnecessary loss of the to-be-washed car in a car washing process.

Details of one or more embodiments of the present application are set forth in the following accompanying drawings and descriptions, such that other features, objectives and advantages of the present application are more concise and accessible.

BRIEF DESCRIPTION OF THE DRAWINGS

The accompanying drawings described herein are used for providing a further understanding of the present application, and constitute part of the present application. The schematic embodiments of the present application and the descriptions thereof are used for interpreting the present application, rather than constituting improper limitation to the present application. In the drawings:

FIG. 10 is a schematic flowchart of an automatic car washing method according to this solution.

Figure 1:
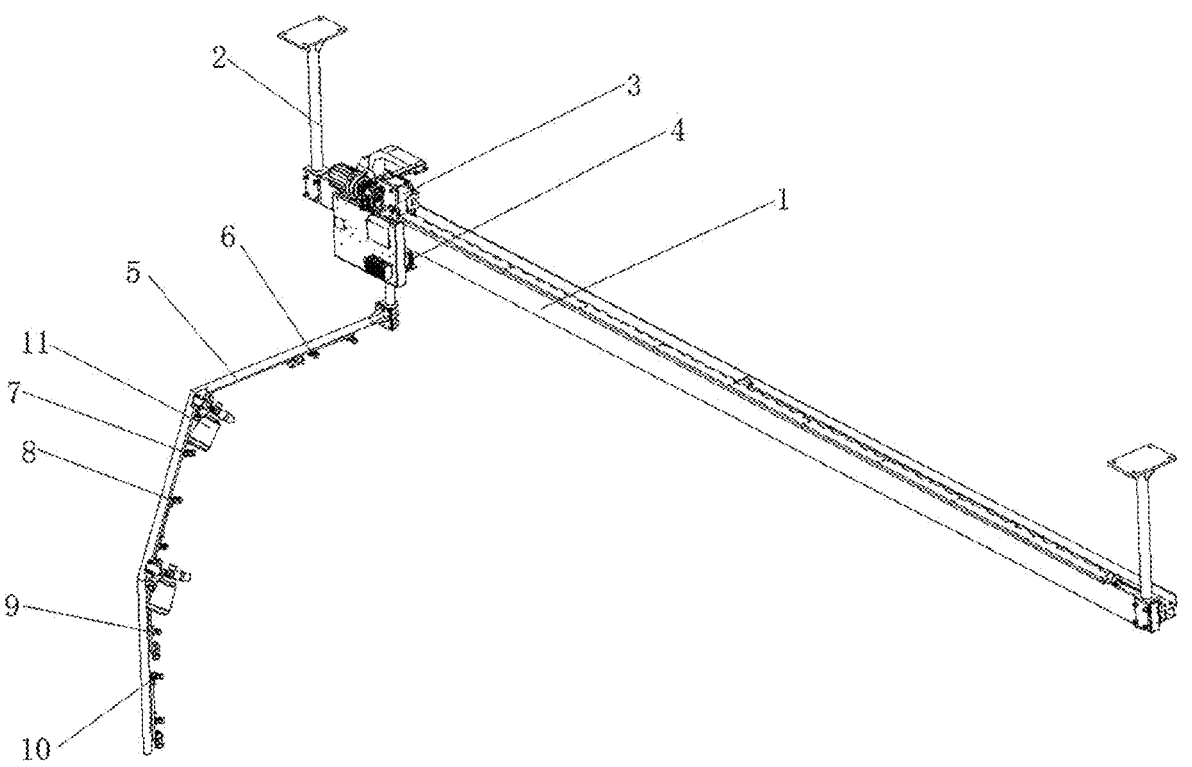
FIG. 1 is a schematic structural diagram of the present invention.
Figure 2:
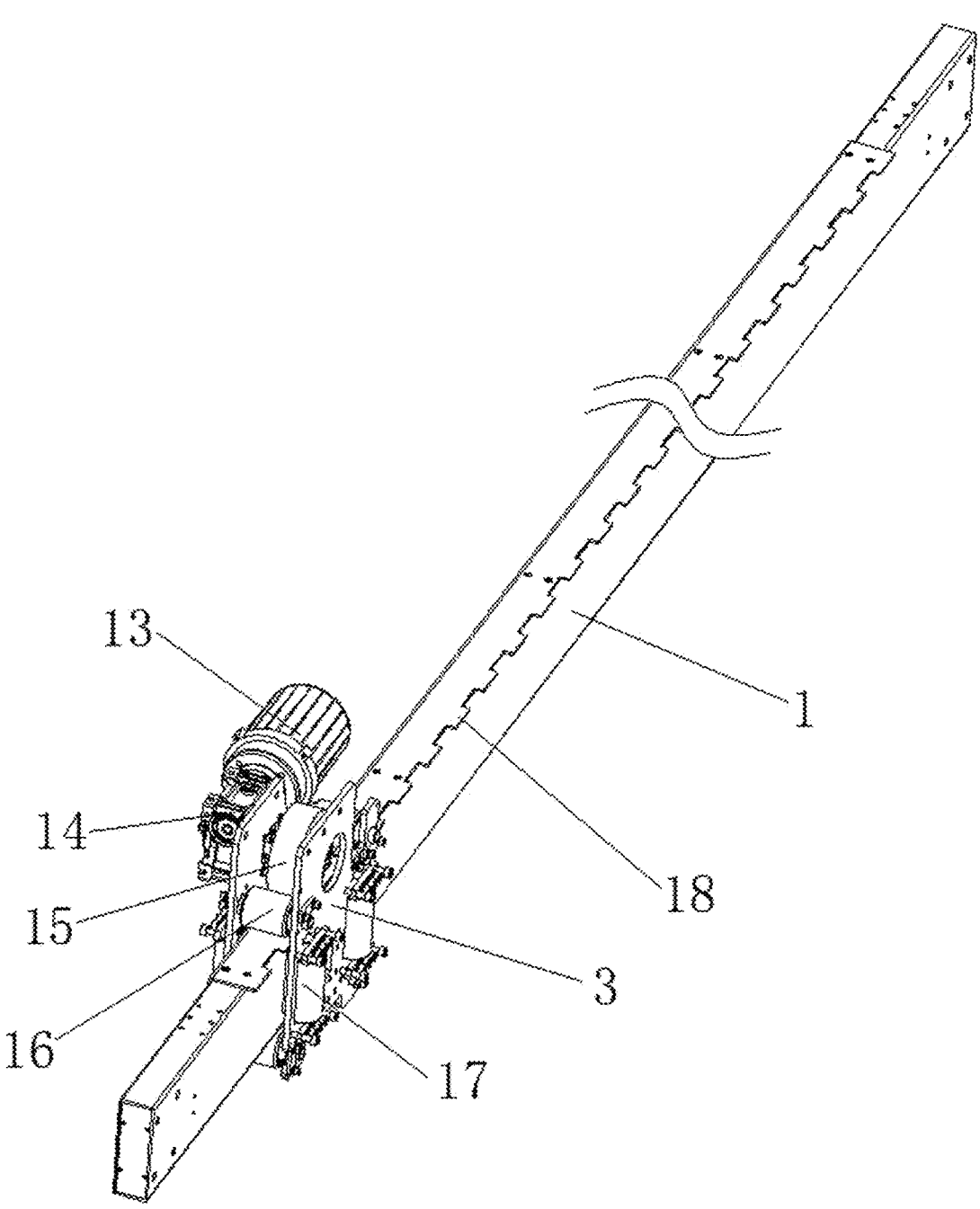
FIG. 2 is a schematic structural diagram of a guide rail device.
Figure 3:
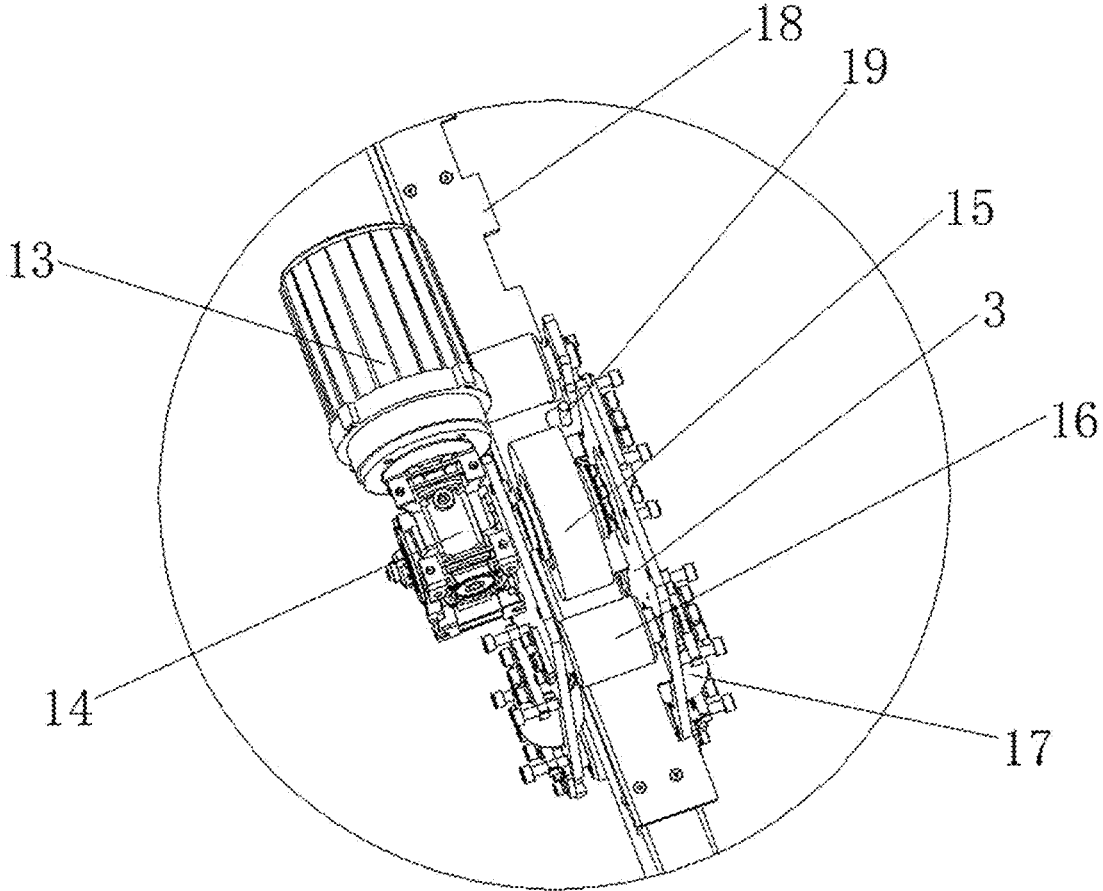
FIG. 3 is a schematic partial structural diagram of a guide rail device.
Figure 4:
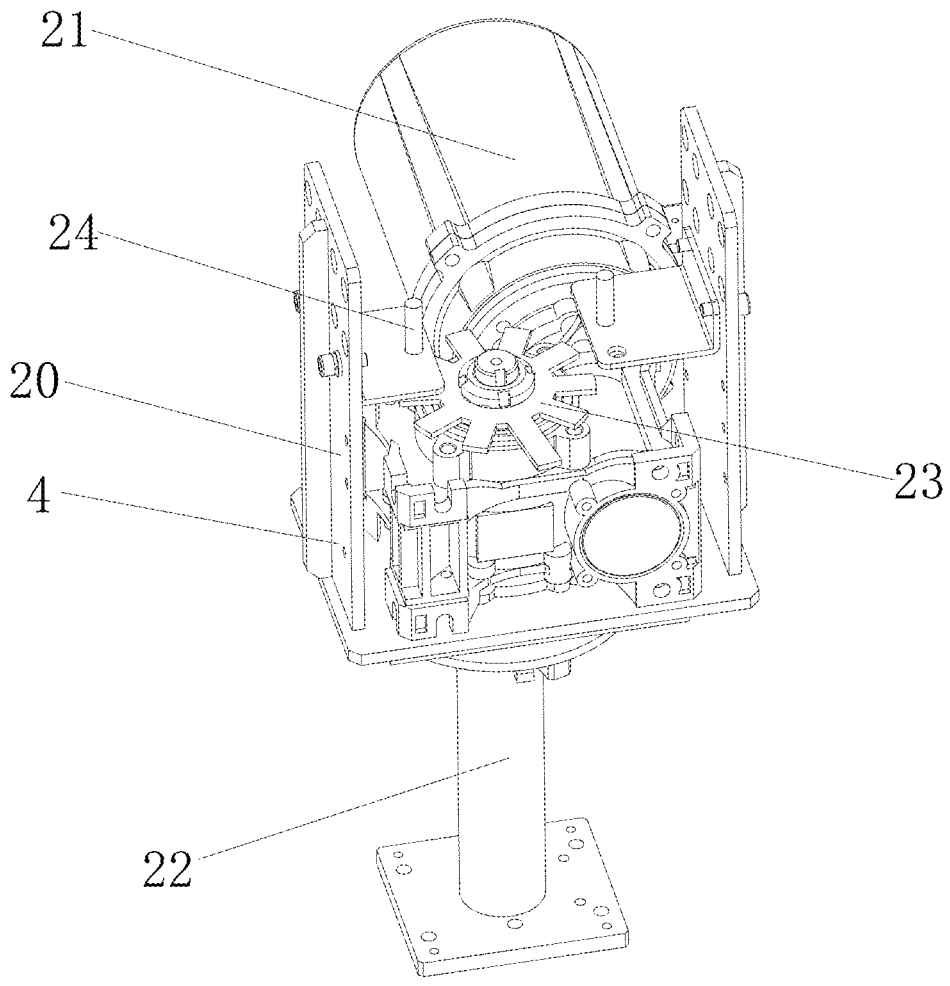
FIG. 4 is a schematic structural diagram of a rotary device.

In the figures: 1. guide rail, 2. mounting arm, 3. translation rack, 4. rotary device, 5. cleaning rack, 6. top water sprayer, 7. first oblique upper water sprayer, 8. second oblique upper water sprayer, 9. first lower water sprayer, 10. second lower water sprayer, 11. car washing shampoo sprayer, 13. first motor, 14. first decelerator, 15. drive wheel, 16. first guide wheel, 17. second guide wheel, 18. marker baffle, 19. first infrared sensor, 20. mounting rack, 21. second motor, 22. second decelerator, 23. angle rotation platform, 24. second infrared sensor, 25. water pipe, 26. sprinkler, 27. support, 28. pressing valve, 29. water inlet, 30. water outlet, 31. pressing rod, 32. push device, 33. cylinder, 34. piston, 35. ejector rod, 36. reset spring, 37. air inlet connector, 38. first water spraying range, 39. second water spraying range, 40. third water spraying range, 41. fourth water spraying range, 42. fifth water spraying range, 43. first spraying range, 44. second spraying range, and 45. standby position.

DESCRIPTION OF THE EMBODIMENTS

Exemplary embodiments will be described in detail herein, and examples thereof are illustrated in accompanying drawings. When the following description refers to the accompanying drawings, the same numbers in different drawings represent the same or similar elements unless otherwise indicated. Implementations described in the following exemplary embodiments do not represent all implementations consistent with one or more embodiments of the description. Instead, these implementations are merely examples of devices and methods consistent with some aspects of one or more embodiments of the description as detailed in the appended claims.

It should be noted that, in other embodiments, steps of a corresponding method are not necessarily executed in an order shown and described in the description. In some other embodiments, the method can include more or fewer steps than described herein. Moreover, a single step described in the description can be broken down into a plurality of steps for description in other embodiments, and a plurality of steps described in the description can be combined as a single step for description in other embodiments.

Embodiment 1

As shown in FIGS. 1-6, this solution provides an automatic car washing device, including a guide rail device and a cleaning rack 5 arranged on the guide rail device. The washing rack 5 is provided with several independently controlled water sprayers arranged at different positions and several independently controlled car washing shampoo sprayers 11, the water sprayers are connected in a shared mode to a single water pipe through switch components, and an end of the single water pipe is connected to a water pump.

The automatic car washing device in this solution has a light structure, and therefore, may be suspended and hung in various spaces. In some embodiments, the automatic car washing device is hung at a ceiling of a car washing room, an overhead space of the car washing room may be used to greatly reduce an occupied area and reduce mounting costs of the automatic car washing device.

Specifically, a specific structure of the guide rail device includes a guide rail 1, a mounting arm 2 is arranged above each of two ends of the guide rail 1, a translation rack 3 is connected to the guide rail 1 in a sliding manner, and the cleaning rack 5 is mounted on the translation rack 3 to implement horizontal movement. As mentioned earlier, in this solution, as long as the mounting arms 2 are connected to a main body of a car washing room or another car washing space, the automatic car washing device may be hung at a corresponding position without occupying excessive space. Specifically, the automatic car washing device according to this solution may be adaptively mounted according to different scenarios of customer stores, including but not limited to a ceiling mounting solution in which the mounting arms 2 are stressed on a top ceiling, a side mounting solution in which the mounting arms 2 are stressed on a side wall, a ground mounting solution in which the mounting arms 2 are stressed on the ground, and a mounting solution in which the mounting arms 2 are stressed on the ground and the ceiling.

In some embodiments, the translation rack 3 translates on the guide rail 1 through guide wheels. Specifically, the translation rack 3 is provided with first guide wheels 16 and second guide wheels 17. At least two groups of first guide wheels 16 and at least two groups of second guide wheels 17 are provided, the two groups of first guide wheels 16 are in contact with an upper side and a lower side of the guide rail 1 respectively, the two groups of second guide wheels 17 are in contact with two horizontal sides of the guide rail 1 respectively, and the first guide wheels 16 and the second guide wheels 17 are limited in two directions, such that the translation rack 3 may smoothly translate on the guide rail 1. In some embodiments, the first guide wheels 16 and the second guide wheels 17 are rotatably connected to the translation rack 3. In a specific embodiment of this solution, each group includes two first guide wheels 16 or two second guide wheels 17.

The translation rack 3 is provided with a drive assembly and a drive wheel 15 connected to the driving assembly, the drive wheel 15 is in contact with a surface of the guide rail 1, and the drive assembly drives the drive wheel 15 to move along the guide rail 1. The first guide wheels 16 and the second guide wheels 17 feature in assisting in movement and guiding. In a specific embodiment, the driving assembly includes a first motor 13 and a first decelerator 14, the first motor 13 is connected to an input shaft of the first decelerator 14, and the drive wheel 15 is connected to an output shaft of the first decelerator 14. During operation, the first motor 13 drives the drive wheel 15 to rotate, so as to drive the translation rack 3 to move in a length direction of the guide rail 1.

Further, several marker baffles 18 are arranged on the guide rail 1, and the marker baffles 18 are arranged in the length direction of the guide rail 1 to play a role in accurate positioning. That is, in this solution, an accurate position of the translation rack 3 is obtained through the marker baffles 18, so as to facilitate subsequent car washing control on the automatic car washing device. In this embodiment, the marker baffles 18 are rectangular and protrude from a side of the guide rail 1, a recess is formed between two adjacent marker baffles 18, a position sensor corresponding to the marker baffles 18 is arranged on the translation rack 3, the position sensor senses positions of the marker baffles 18 to implement positioning, and the position sensor is used for sensing the position of the translation rack 3.

In the embodiment of this solution, the position sensor is selected as a first infrared sensor 19. When the translation rack 3 moves along the guide rail 1, the first infrared sensor 19 on the translation rack 3 passes through each marker baffle 18 in sequence. When the first infrared sensor 19 is located above the marker baffle, infrared rays generated by the first infrared sensor 19 are blocked and reflected, such that the marker baffle 18 is sensed. Conversely, when the first infrared sensor 19 is located above the recess, the infrared rays generated by the first infrared sensor are not blocked, and besides, a distance between two adjacent marker baffles is fixed and known, such that a moving distance of the translation rack may be obtained by analyzing the number of marker baffles 18 sensed by the first infrared sensor.

In some embodiments, a rotary device 4 is arranged between the translation rack 3 and the cleaning rack 5, and the rotary device 4 may drive the cleaning rack 5 to rotate horizontally, so as to implement more angles of car washing directions. That is, in this solution, the rotary device 4 may drive the cleaning rack 5 to rotate along the periphery of a car body to clean the car body in different directions. A fixed end of the rotary device 4 is mounted on the translation rack 3, and a rotatable end of the rotary device 4 is connected to the cleaning rack 5.

Specifically, in a specific embodiment of this solution, the rotary device 4 includes a mounting rack 20, the mounting rack 20 is provided with a second motor 21 and a second decelerator 22, the second motor 21 is connected to an input shaft of the second decelerator 22, an output shaft of the second decelerator 22 is arranged in a vertical direction, and the cleaning rack 5 is mounted on the output shaft of the second decelerator 22. The first motor 21 drives the second decelerator 22 to rotate in a horizontal direction, so as to drive the cleaning rack 5 to rotate. In this embodiment, the mounting rack 20 is "U"-shaped, and the mounting rack 20 is fixedly connected to the translation rack 3. During operation, the second motor 21 drives the output shaft of the second decelerator 22 to rotate, so as to drive the cleaning rack to rotate.

Further, the rotary device includes a rotating angle feedback device, and through the rotating angle feedback device, the position of the cleaning rack 5 may also be accurately known. In the embodiment of this solution, the rotating angle feedback device includes an angle rotation platform 23 connected to the output shaft of the second decelerator 22 and a second position sensor arranged on the mounting rack 20, the second position sensor may be a second infrared sensor 24, several baffles are arranged in a circumferential direction of the angle rotation platform 23, the second position sensor senses positions of the baffles to implement positioning, and a through recess is formed between two adjacent baffles. During rotation of the angle rotation platform 23, the baffles pass under the second infrared sensor 24 in sequence. The output shaft rotates to drive the angle rotation platform to rotate synchronously. When the angle rotation platform rotates, the baffles arranged in the circumferential direction of the angle rotation platform pass under the second infrared sensor in sequence. When a baffle passes under the second infrared sensor, the baffle blocks and reflects infrared rays emitted by the second infrared sensor, so as to be sensed by the second infrared sensor, and besides, a spacing angle between two adjacent baffles is fixed and known, such that a rotating angle of the cleaning rack may be obtained by analyzing the number of the baffles sensed by the second infrared sensor, so as to implement a feedback function of the rotating angle.

The water sprayers in this solution are arranged on the cleaning rack 5, and different cleaning racks 5 may be designed according to different car washing requirements. As the automatic car washing device according to this solution employs a single-point and single-segment car washing mode, the cleaning rack 5 according to this solution is adaptively designed to include different cleaning segments, that is, the cleaning rack 5 at least includes two cleaning segments arranged in different directions, the different cleaning segments are in communication with each other through the single water pipe, and at least one independently controlled water sprayer is arranged on each cleaning segment.

Figure 5:
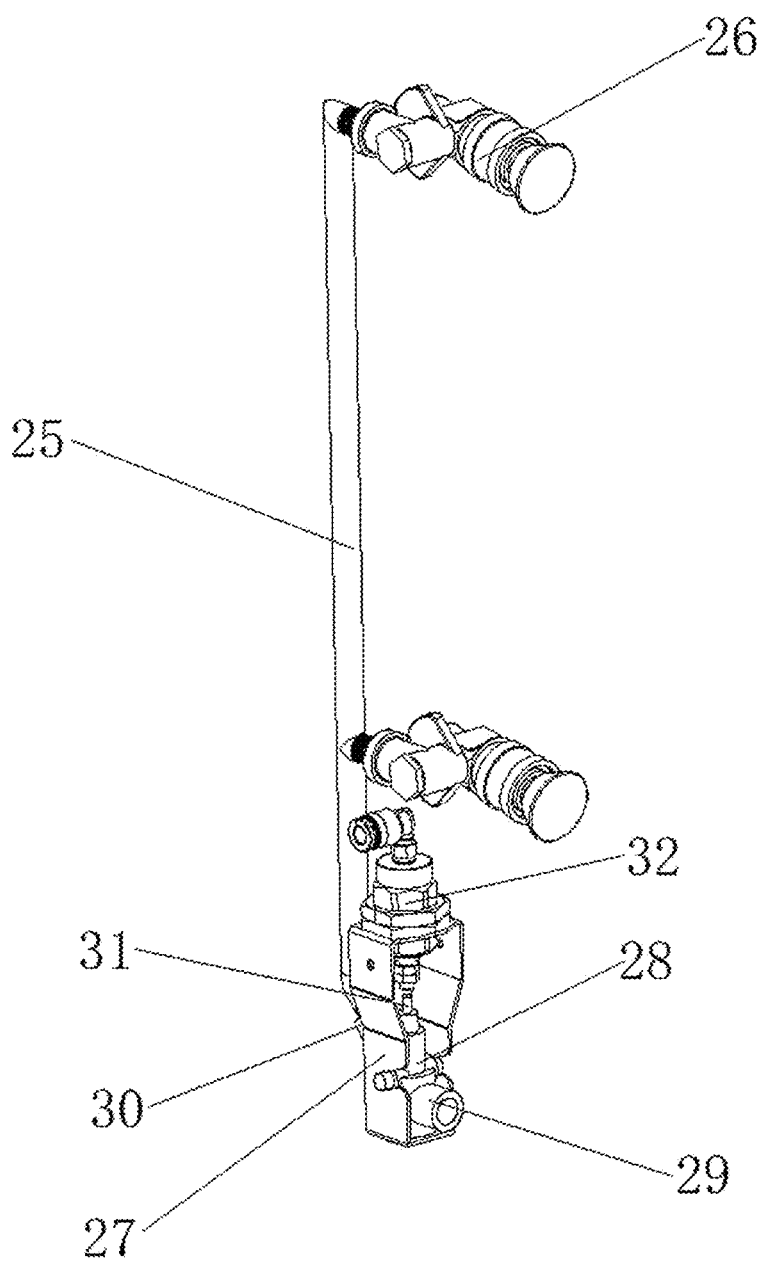
FIG. 5 is a schematic structural diagram of a water spray cleaning assembly.
Figure 6:
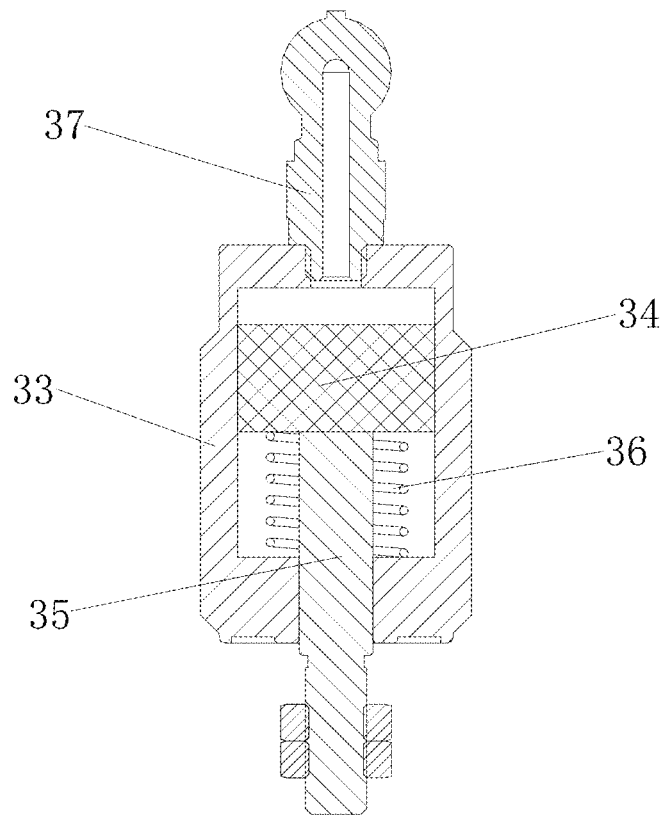
FIG. 6 is a schematic structural diagram of a push device.

As shown in FIG. 5, the water sprayer includes at least one sprinkler 26 arranged on the water pipe 25. In this embodiment, two sprinklers 26 are connected to the water pipe 25. An end of the water pipe 25 is connected to a control valve assembly serving as a switch assembly, and the different water sprayers share the same water pipe 25. The benefits are as follows: this solution may minimize apparatus costs of the automatic car washing device, only one or several booster pumps are required to deliver water in the water pipe 25, and only the corresponding control valve assembly is controlled to implement water spraying of the water sprayers at different positions.

Specifically, the control valve assembly includes a support 27 and a pressing valve 28 arranged on the support 27. The pressing valve 28 is provided with a water inlet 29, a water outlet 30, and a pressing rod 31. The water outlet 30 of the pressing valve 28 is connected to one end of the water pipe 28, and the other end of the water pipe 28 is closed. The water inlet of the pressing valve 28 is connected to a water inlet pipe, and the water inlet pipe is connected to a booster pump. The control valve assembly further includes a push device 32 for pushing the pressing rod to move. The pressing valve 28 employs the prior art, and reference may be made to the invention patent No. CN110425308A for a structure and a principle of the pressing valve 28. In the present invention, the booster pump supplies water to the water pipe through the water inlet pipe, and flow and shut-off of water are controlled through the control valve assembly. When the push device presses the pressing rod on the pressing valve, the pressing valve is opened, and water may enter the water pipe and be sprayed out from the sprinkler. When the pressing rod on the pressing valve is not pressed, the pressing valve is closed, and the sprinkler may not spray water. The push device 32 in this solution may be controlled through remote communication, that is, a user may remotely control the corresponding push device 32 to open and close the corresponding water sprayer.

Further, the push device 32 includes a cylinder 33, a piston 34 is arranged in the cylinder 33, an ejector rod 35 is connected to the piston 34, a piston cavity is formed between the piston 34 and one end in the cylinder 33, and a reset spring 36 is arranged between the piston 34 and the other end in the cylinder. An end, away from the piston cavity, of the cylinder 33 is provided with a through hole, the ejector rod 35 passes the through hole, and a front end of the ejector rod 35 faces directly the pressing rod 31 on the pressing valve 28. The cylinder 33 is further provided with an air inlet connector 37 in communication with the piston cavity. The air inlet connector is connected to an air pump through an air guide pipe. When compressed air enters the piston cavity, the piston is pushed to move, then the ejector rod is driven to be ejected, and the ejector rod presses the pressing rod on the pressing valve downward, so as to open the pressing valve. When the air in the piston rod is pushed out, air pressure in the piston cavity is reduced, and the piston and the ejector rod move to initial positions under the action of the reset spring, such that the ejector rod is far away from the pressing rod on the pressing valve, and the pressing valve is closed. In the present invention, the push device may conveniently control the opening and closing of the pressing valve under the drive of air pressure, so as to control the opening and closing of the water sprayer, and achieve a simple and reliable control structure and a desirable control effect.

In a specific embodiment, the cleaning rack 5 includes a horizontal segment, an oblique segment and a vertical segment, where the oblique segment is located between the horizontal segment and the vertical segment. The horizontal segment is connected to an upper end of the oblique segment, and the vertical segment is connected to a lower end of the oblique segment. In the present invention, the water sprayers are divided into three groups, namely, a top water sprayer 6, oblique upper water sprayers and lower water sprayers, so as to clean different parts of a car body.

In a specific embodiment, one top water sprayer 6 is provided on the horizontal segment of the cleaning rack 5, two oblique upper water sprayers are provided, that is a first oblique upper water sprayer 7 and a second oblique upper water sprayer 8, both the first oblique upper water sprayer 7 and the second oblique upper water sprayer 8 are arranged on the oblique segment of the cleaning rack 5, and the first oblique upper water sprayer 7 and the second oblique upper water sprayer 8 are arranged at different heights, Two lower water sprayers are provided, that is a first lower water sprayer 9 and a second lower water sprayer 10, both the first lower water sprayer 9 and the second lower water sprayer 10 are arranged on the vertical segment of the cleaning rack 5, and the first lower water sprayer 9 and the second lower water sprayer 10 are arranged at different heights. The top water sprayer 6 is used for spraying water to clean a top of the car body, the first oblique upper water sprayer 7 and the second oblique upper water sprayer 8 are used for spraying water to clean an oblique upper position of the car body, and the first lower water sprayer 9 and the second lower water sprayer 10 are used for spraying water to clean a bottom of the car body.

In the present invention, two oblique upper water sprayers and two lower water sprayers are provided for suitability for cars with different heights. A small and low car may be cleaned by using the oblique upper water sprayer at a lower position and the lower water sprayers, and a large and high car may be cleaned by using the oblique upper water sprayer at an upper position and the lower water sprayers, so as to achieve better suitability for the cars with different heights. The top water sprayer 6, the oblique upper water sprayers and the lower water sprayers have the same structure.

In some embodiments, at least one car washing shampoo sprayer 11 is arranged on the washing rack 5, and the car washing shampoo sprayer 11 is independently controlled by a switch assembly. In this embodiment, two car washing shampoo sprayers 11 are provided, one of the car washing shampoo sprayers 11 is used for spraying a car washing shampoo to the top of the car body, and the other car washing shampoo sprayer 11 is used for spraying the car washing shampoo to a side of the car body. The car washing shampoo sprayer 11 exists in the prior art, and may automatically spray the car washing shampoo. A solenoid valve is provided on the car washing shampoo sprayer 11, and spraying by the car washing shampoo sprayer 11 is controlled through the solenoid valve.

Figure 7:
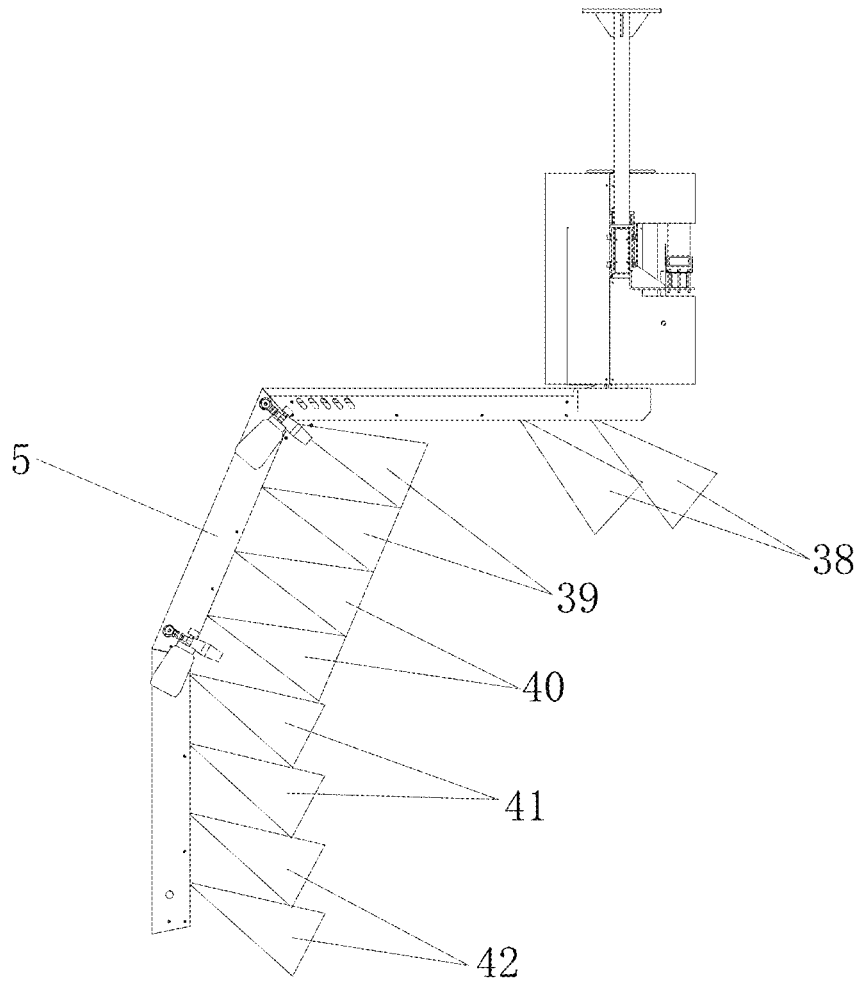
FIG. 7 is a schematic diagram of water spraying ranges of water spraying cleaning assemblies according to the present invention.
Figure 8:
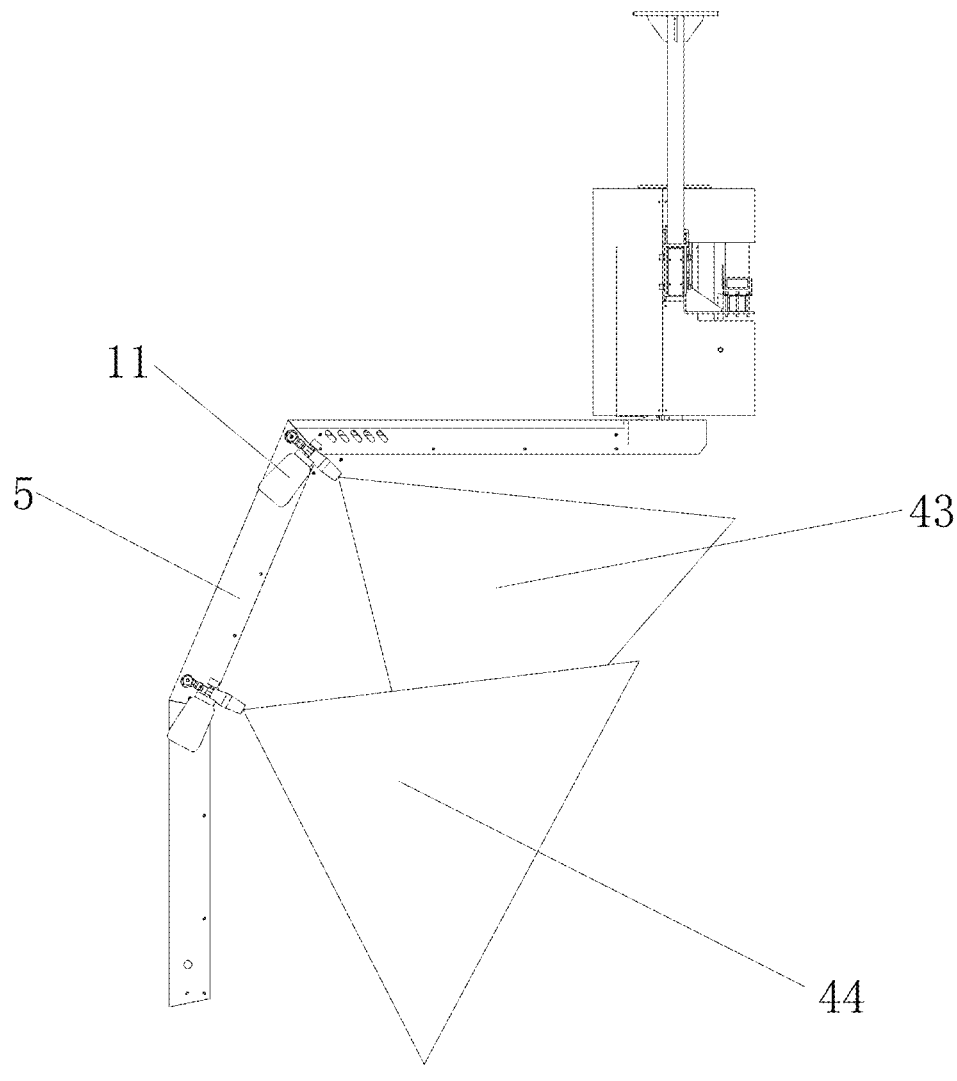
FIG. 8 is a schematic diagram of spraying ranges of car washing shampoo sprayers according to the present invention.

In the present invention, water spraying ranges of the top water sprayer 6, the first oblique upper water sprayer 7, the second oblique upper water sprayer 8, the first lower water sprayer 9, and the second lower water sprayer 10 are shown in FIG. 7. In FIG. 7, reference numeral 38 represents the water spraying range of the top water sprayer 6, that is, a first water spraying range. Reference numeral 39 represents the water spraying range of the first oblique upper water sprayer 7, that is, a second water spraying range. Reference numeral 40 represents the water spraying range of the second oblique upper water sprayer 8, that is, a third water spraying range. Reference numeral 41 represents the water spraying range of the first lower water sprayer 9, that is, a fourth water spraying range. Reference numeral 42 represents a water spraying range of the second lower sprinkler 10, that is, a fifth water spraying range. The water spraying ranges of the top water sprayer, the oblique upper water sprayers and the lower water sprayers may cover top, oblique upper and lower areas of a car body, so as to completely clean an outer surface of a car. Car washing shampoo spraying ranges of the two car washing shampoo sprayers 11 on the washing rack 5 are shown in FIG. 8, where reference numeral 43 represents the car washing shampoo spraying range of the upper car washing shampoo sprayer, and reference numeral 44 represents the car washing shampoo spraying range of the lower car washing shampoo sprayer 11. When the device is operating, the cleaning rack may move in the length direction of a car body through the guide rail device, the rotary device may drive the cleaning rack to rotate, and the cleaning rack may move around an outer side of the car body through the combined action of the rotary device and the guide rail device, so as to clean the outer side of the car body in all directions. A moving track of the cleaning rack is

Figure 9:
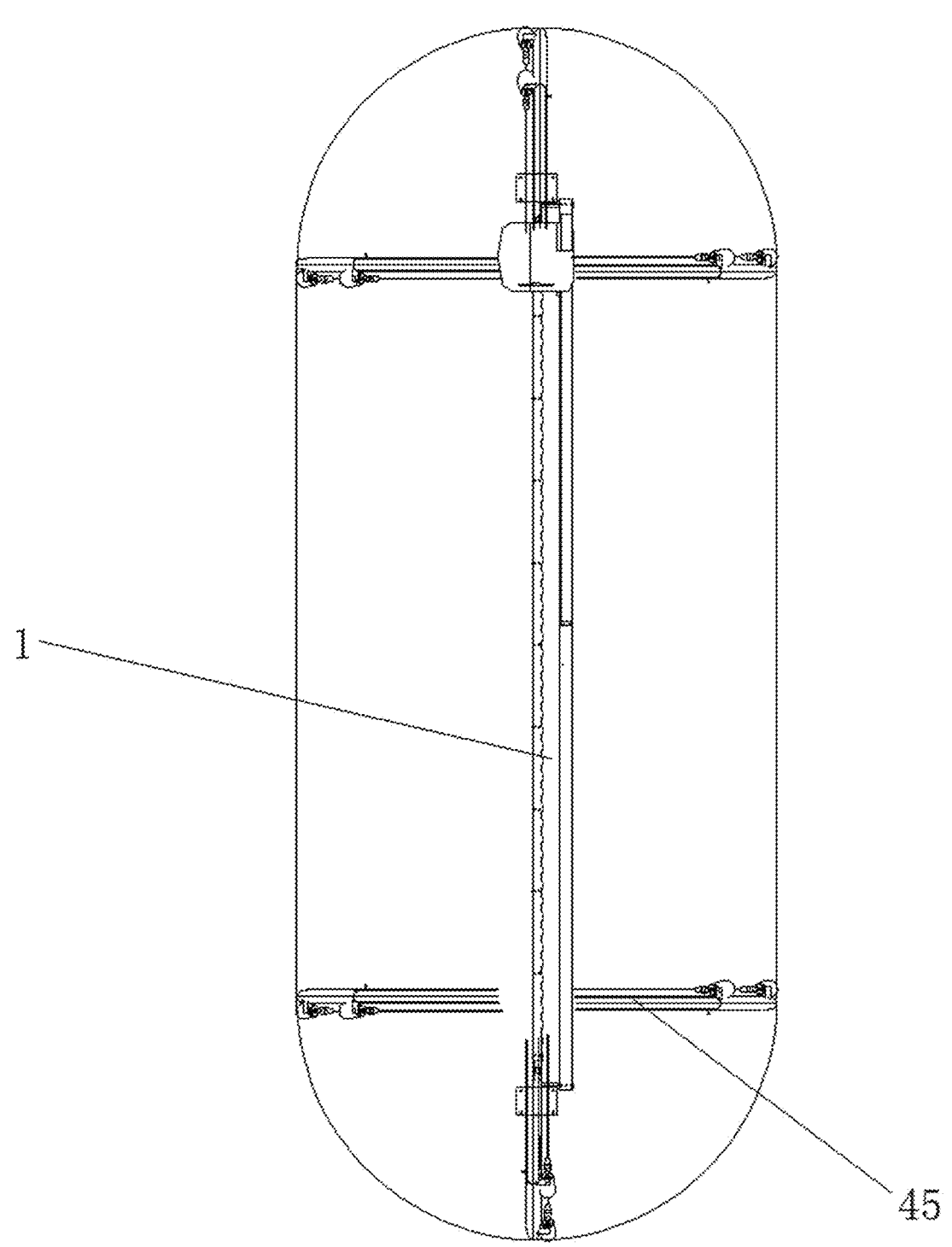
FIG. 9 is a schematic diagram of a moving trajectory of a cleaning rack during use of the present invention.

9 shown in FIG. 9, where reference numeral 45 represents a standby position of the cleaning rack.

In the present invention, the operation of the guide rail device, the operation of the rotary device, the opening and closing of each water sprayer, and the opening and closing of the car washing shampoo sprayers 11 are all controlled by a control circuit on the device.

In the present invention, each of the top water sprayer, the oblique upper water sprayer and the lower water sprayer on the cleaning rack are independently controlled, so each water sprayer may be opened or closed independently. When cleaning, a single water sprayer or several specific water sprayers may be opened separately and spray water to clean corresponding parts of the car body. Spray pressure of the single or several specific water sprayers is improved by reducing the number of opened water sprayers, such that the corresponding parts of the car body may be effectively cleaned, dirt attached to the car body may be effectively washed down, and the cleaning effect can be improved.

In some preferred embodiments, an angle between different cleaning segments of the cleaning rack 5 is adjustable. That is, the cleaning segments of the cleaning rack 5 are rotatably connected to each other, and the internal water pipe 25 is designed as a flexible hard water pipe.

Embodiment 2

This solution provides an automatic car washing method based on the foregoing automatic car washing device, which cleans a car body entering a car washing area and includes the following steps:

A car washing instruction is acquired, where the car washing instruction at least includes a cleaning position and corresponding cleaning duration; and A cleaning rack is moved to a corresponding cleaning position based on the car washing instruction, a corresponding water sprayer and/or a corresponding car washing shampoo sprayer is opened in sequence based on the car washing instruction, and kept operating for set cleaning duration, and unopened water sprayers and/or car washing shampoo sprayers are kept closed.

This solution is greatly different from other car washing methods in that this solution may control some water sprayers on the cleaning rack at single points according to the car washing instruction, so as to clean specific positions, which may not only reduce car washing costs, but also save car washing resources.

In some embodiments, the car washing instruction includes a set car washing procedure, each set car washing procedure includes sequential washing positions and washing duration corresponding to each washing position, and the washing rack is moved to a corresponding washing position, and opening time of each water sprayer is set according to the car washing procedure. Because this solution includes at least one independently controlled water sprayer, different car washing procedures may be implemented by controlling opening time of different water sprayers. The cleaning positions refer to car body parts that need to be cleaned, such as wheels, windows, and a roof cover. The cleaning duration refers to cleaning duration of each cleaning position, and specific duration is not limited.

The cleaning positions are associated with positions of water sprayers and a position of the moving rack. In this solution, the cleaning rack is moved to corresponding cleaning positions, and water sprayers at the corresponding positions are opened. For example, if the cleaning position is the roof cover, the cleaning rack is moved to a position where the roof is located, and the water sprayer arranged at the top of the cleaning rack is opened. It is worth mentioning that after the corresponding water sprayers are opened, the cleaning rack 5 may be set to move to clean different positions of the car body.

The car washing procedure in this solution includes, but is not limited to, a fast car washing procedure, an ordinary car washing procedure, a fine car washing procedure, etc. A cleaning position and cleaning duration set in each car washing procedure are different. The user may select the car washing procedure freely according to requirements.

For example, when the car washing procedure set in this solution is the ordinary car washing procedure, the ordinary car washing procedure includes flushing the car body rotatably around, flushing the roof, spraying a cleaner, then flushing the roof, and finally flushing the car body. In this case, the corresponding automatic car washing method includes the following steps:

1) A car washing instruction corresponding to the ordinary car washing procedure is acquired.
2) The oblique upper water sprayers and the lower water sprayers on the cleaning rack 5 are opened and the top water sprayer 6 is closed based on the car washing instruction, the cleaning rack 5 is moved at the same time for one circle along a periphery of a car, and the oblique upper water sprayers and the lower water sprayers spray water to clean an oblique upper position and a lower position of the car, so as to complete an effect of flushing a car body. In this step, the top water sprayer is closed, and the oblique upper and lower positions of the car are flushed through the oblique upper water sprayers and the lower water sprayers, such that the oblique upper water sprayers and the lower water sprayers may obtain high flushing pressure, an effect of flushing the oblique upper and lower positions of the car may ensured, and dirt on the oblique upper and lower positions of the car may be effectively flushed down.
3) After corresponding cleaning duration, the oblique upper water sprayers and the lower water sprayers on the cleaning rack 5 are closed and the top water sprayer 6 is opened based on the car washing instruction, the cleaning rack 5 is moved at the same time for one circle along the periphery of the car, and the top water sprayer 6 sprays water to clean a top of the car. In this step, the oblique upper water sprayers and the lower water sprayers are closed, and the top water sprayer is opened separately to flush the top of the car, such that the top water sprayer may obtain high flushing pressure to ensure that dirt on the top of the car may be effectively flushed down. Moreover, in this method, the oblique upper and lower positions of the car are flushed first, and then the top of the car is flushed, such that water flows down along the sides of the car after flushing the top and flows through the oblique upper and lower positions of the car, the oblique upper and lower positions of the car may be further flushed and kept in a wet state, thereby facilitating subsequent spraying and application of a car washing shampoo.
4) After corresponding cleaning duration, the top water sprayer 6, the oblique upper water sprayers and the lower water sprayers are closed based on the car washing instruction, the car washing shampoo sprayers 11 are opened, and the cleaning rack 5 is moved for one circle along the periphery of the car body to spray a car washing shampoo onto the car body. After the car washing shampoo is sprayed, the device stops operating for a period of time, during which the car washing shampoo is uniformly applied on the car body. The car washing shampoo may be applied manually or mechanically.

5) Then, the top water sprayer 6 on the washing rack is opened based on the car washing instruction, the washing rack 5 is moved at the same time for one circle along the periphery of the car body, and the car washing shampoo on the car is flushed through the top water sprayer 6.

6) After cleaning duration, the oblique upper water sprayers and the lower water sprayers on the cleaning rack 5 are opened and the top water sprayer 6 is closed based on the car washing instruction, the cleaning rack 5 is moved at the same time for one circle along the periphery of the car body, and the car washing shampoo on the car is flushed through the oblique upper water sprayers and the lower water sprayers. In this method, the top water sprayer sprays water to flush the top of the car first. During the flushing process, the water on the top of the car flows down to pre-flush the sides of the car. After the top is flushed, the oblique upper and lower positions of the car are flushed, thereby improving a flushing effect.

In some other embodiments, the car washing instruction includes a user selected car washing procedure, the car washing procedure includes a user set cleaning position and corresponding cleaning duration, and opening time of each water sprayer and/or car washing shampoo sprayer is set according to the car washing procedure. Because this solution at least includes one independently controlled water sprayer, different car washing procedures may be implemented by controlling the opening time of different water sprayers. The cleaning positions refer to car body parts that need to be cleaned, such as wheels, windows, and a roof cover. The cleaning duration refers to cleaning duration of each cleaning position, and specific duration is not limited.

In this embodiment, a user may actively select parts to be cleaned, and the whole car does not need to be cleaned every time, thereby greatly reducing car washing costs. That is, in the step that "a car washing instruction is acquired", a car washing demand of the user is acquired and converted into the car washing instruction.

The car washing demand of the user includes, but is not limited to, special settings of cleaning of a specific car body part and cleaning duration of the specific car body part. In a system, the car washing demand of the user is converted into a corresponding car washing instruction, and the car washing instruction is performed. Different from conventional car washing methods using fixed car washing procedures, this solution returns an initiative of car washing to the user, and the user selects car washing services needed. For example, if some users only need to clean a roof instead of a car body, the corresponding car washing instruction is "cleaning of a roof".

In this embodiment, the user may implement customized services of personalized car washing through an APP or an applet. A specific usage scenario is as follows: When washing a car, a user may first park the car to a car washing position, and then directly enter a mobile APP or scan a quick response code on a device to enter a car washing applet. Through the mobile APP or the car washing applet, the user may set a car washing process of the device according to need thereof. Specifically, the user may set an opening order of the top water sprayer, the oblique upper water sprayers and the lower water sprayers on the cleaning rack according to need thereof. After the process setting is completed, the user clicks a car washing start button on the mobile APP or the car washing applet, and then the device cleans the car according to the set process. After the device completes all the car washing process, the device stops washing the car.

In the step that "a cleaning rack is moved to a corresponding cleaning position based on the car washing instruction", because positioning assemblies are arranged on both the guide rail device and the rotary device of the automatic car washing device in this solution, a moving distance of the cleaning rack in this case may be accurately obtained through the positioning assemblies, and the position of the cleaning rack may be adjusted and controlled through the moving distance.

In some embodiments, the cleaning rack of the automatic car washing device is connected to at least one booster pump. In some embodiments, the cleaning rack may be connected to two or more booster pumps, which is not particularly limited in this solution. However, it should be restated that the booster pumps with the same pressure may deliver water pressure to further positions by closing the certain number of water sprayers in this solution, so costs of the automatic car washing device according to this solution may be minimized.

In a preferred embodiment, the automatic car washing device is equipped with a car dirt identification camera, an image captured by the car dirt identification camera is transmitted to an embedded main board, a car dirt identification method is built in the embedded main board to identify a car dirt position, and the embedded main board controls the automatic car washing device to clean the car dirt position in an intensified mode.

In this case, in the step that "a car washing instruction is acquired, where the car washing instruction at least includes a cleaning position and corresponding cleaning duration", the cleaning position includes a car dirt position, the corresponding cleaning duration is a dirt cleaning duration, and the dirt cleaning duration is longer than cleaning duration of other positions.

The car dirt position is obtained by the car dirt identification camera and a matching car dirt identification method, where the car dirt identification camera is arranged on a side of the automatic car washing device to acquire an image of a to-be-washed car, and the car dirt position is identified from the image by using the car dirt identification method.

In some embodiments, the car dirt identification method employs a target detection method corresponding to the car dirt identification model. Specifically, a target detection model is trained through an image with marked car dirt to obtain the car dirt identification model, and the image, captured by the car dirt identification camera, of the to-be-washed car is input into the car dirt identification model to obtain the car dirt position.

In some embodiments, a target detection model is trained through an image with car dirt and a dirt area marked and the dirt area to obtain the car dirt identification model, and the image, captured by the car dirt identification camera, of the to-be-washed car is input into the car dirt identification model to obtain the car dirt position and a degree of dirt. In this case, long dirt cleaning duration is set for a car dirt position with a high degree of dirt, and short dirt cleaning duration is set for the car dirt position with a low degree of dirt. A large dirt area indicates a high degree of dirt.

In addition, for the car dirt position with the high degree of dirt, not only may the dirt cleaning duration be prolonged, but also the water sprayer at the corresponding position may be opened separately when the car dirt position is cleaned, so as to ensure that more water pressure is concentrated in the car dirt position.

Embodiment 3

This solution is optimized on the basis of a basic automatic car washing device, and a hub cleaning structure for hub cleaning is designed. This solution provides an automatic car washing device, including a guide rail device and a cleaning rack 5 arranged on the guide rail device, where the cleaning rack 5 is provided with several independently controlled water sprayers arranged at different positions and several independently controlled car washing shampoo sprayers 11, a bottom of the cleaning rack 5 is provided with a hub cleaning nozzle, the water sprayers are connected in a shared mode to a single water pipe through corresponding switch assemblies, an end of the single water pipe is connected to a water pump, a hub cleaner delivery device is connected to the hub cleaning nozzle through a supply line, and the supply line and the single water pipe are arranged independently, such that cleaning of a hub does not interfere with work of the water sprayers at other parts.

In some preferred embodiments, the hub cleaning nozzle is designed as a universal sector nozzle, and an angle of the universal sector nozzle is adjustable to clean the hub in different directions.

In some embodiments, the hub cleaner delivery device is placed on the ground, and the hub cleaner delivery device includes a hub cleaner reservoir, a cleaner suction pipe, a delivery pump and a delivery pipe that are connected in sequence, and the other end of the delivery pipe is connected to the hub cleaning nozzle, and the delivery pump sucks a hub cleaner from the hub cleaner reservoir and pumps the same to the hub cleaning nozzle, so as to deliver the hub cleaner.

In a preferred embodiment of this solution, the hub cleaner is a self-cleaning liquid, and the delivery pump is a diaphragm pump in view of effects of corrosion resistance, adjustable pressure and back flow prevention of the diaphragm pump. In particular, the automatic car washing device according to this solution is used outdoors, and the delivery pump is prone to corrosion when exposed to the natural environment for a long time, so the corrosion-resistant diaphragm pump is selected as the delivery pump in this solution.

In some embodiments, start and stop of the delivery pump are controlled through a hub cleaning control valve, and when the delivery pump is started, the hub cleaner is delivered to a position where the hub cleaning nozzle is located to complete cleaner spraying.

In addition, it should be noted that the cleaning rack 5 according to this solution may be translated and rotated relative to the translation rack 3. In this solution, the hub cleaner delivery device is arranged at a corner of the automatic car washing device, and the delivery pipe is long enough to satisfy a moving distance of the cleaning rack. Of course, in order to avoid a problem of disorder of the delivery pipe, the hub cleaner delivery device according to this solution is provided with a winding apparatus, and the delivery pipe is arranged on the winding apparatus for moving a distance, in this way, the delivery pipe may be guaranteed to move along a preset trajectory when being stretched and may also be wound back to an original position when being retracted.

It is worth mentioning that, in this solution, the hub cleaner delivery device is designed to be separated from pipelines of the water sprayers, because the hub cleaner itself is corrosive to a certain degree. In order to avoid unnecessary damage of the hub cleaner to a car body, a hub identification camera and a matching hub identification method are provided in this solution. Specifically, this solution includes the following steps:

A car washing instruction is acquired, where the car washing instruction at least includes a cleaning position and corresponding cleaning duration; and A cleaning rack is moved to a corresponding cleaning position based on the car washing instruction; under the condition that the cleaning position is a hub, a car hub image is acquired, the hub is identified based on the car hub image by using a hub identification model, and a corresponding water sprayer, a corresponding hub cleaning nozzle and/or a corresponding car washing shampoo sprayer are opened in sequence based on the car washing instruction and kept operating for set cleaning duration; and under the condition that a hub cleaning nozzle needs to be opened, the hub cleaning nozzle of the cleaning rack is moved to a position where the hub is located, and unopened water sprayers, hub cleaning nozzles and/or car washing shampoo sprayers are kept closed.

In some embodiments, the car hub image is acquired through the hub identification camera arranged on the automatic car washing device in this solution, and the car hub image at least includes a car hub.

In some embodiments, the hub identification model in this solution employs a YOLOV5 model that is the most stable, accurate and efficient in the industry, or other model structures. In addition, because the hub in the car is a small target compared with the whole car, the hub identification model is adaptively modified in this solution. After a 17th layer of a head position of the hub identification model, a feature image is up-sampled, such that the feature image continues to be expanded. Besides, a 160×160 feature image obtained at a 20th layer is fused with a feature image of a second layer in a backbone network through concat, so as to obtain a larger feature image for small target detection.

In the step that "the hub cleaning nozzle of the cleaning rack is moved to a position where the hub is located", a vertical distance between the cleaning rack and the hub is computed based on an angle of view of the hub identification camera and a horizontal distance between the cleaning rack and the car body through a trigonometric function, and the hub cleaning nozzle of the cleaning rack is moved to a position opposite the hub.

In addition, because the hub identification camera takes time for capturing, and the hub identification model also takes reasoning time for identification, the reasoning time and the capturing time need to be sent together to a control system for adjusting the time and duration for cleaning the hub in this solution.

Embodiment 4

This solution is further optimized on the basis of the automatic car washing device designed in Embodiment 1 or Embodiment 3, so as to implement active safety and passive car washing of the automatic car washing device.

Specifically, a distance sensor is arranged on a cleaning rack 5 of an automatic car washing device according to this solution, where the distance sensor is used for sensing a distance between a side obstacle and the cleaning rack. In some embodiments, the distance sensor is an ultrasonic radar probe, and the side obstacle includes but is not limited to a car.

Corresponding to the automatic car washing device equipped with the distance sensor, an automatic car washing method in this solution includes the following steps:

A car washing instruction is acquired, where the car washing instruction at least includes a cleaning position and corresponding cleaning duration; and A cleaning rack is moved to a corresponding cleaning position based on the car washing instruction, a distance between the cleaning rack and a side obstacle is acquired, whether the distance is within a preset safe distance is determined, movement of the cleaning rack is stopped under the condition that the distance is not within the safe distance, or under the condition that the distance is within the safe distance, a corresponding water sprayer and/or a car washing shampoo sprayer is opened in sequence based on the car washing instruction, and kept operating for the set cleaning duration, and unopened water sprayers and/or car washing shampoo sprayers are kept closed.

It should be particularly noted that the automatic car washing device according to this solution is suitable for an unmanned car washing scenario. In the unmanned car washing scenario, when an owner drives a to-be-washed car into a car washing area, parking space deviation inevitably occurs, or an obstacle (such as a person) appears between the to-be-washed car and the cleaning rack. In order to avoid unnecessary safety loss of the obstacle or the car caused by the cleaning rack in a cleaning process as much as possible, an active safety procedure is provided in the automatic car washing device in this solution.

Specifically, in the step that "a distance between the cleaning rack and a side obstacle is acquired", the distance sensed by the distance sensor arranged on the cleaning rack is acquired. In this solution, distance sensors are arranged in four directions under the cleaning rack, and the distance sensors upload detected distances to a control board of a system.

In the step that "whether the distance is within a preset safe distance is determined", different safe distances are set for cleaning instructions of different modes, a safe distance in a corresponding mode is selected based on the cleaning instruction, and whether the distance is within the safe distance is determined.

In this solution, the mode of the cleaning instruction includes a moving speed mode and a moving mode, different safe distances are set for different moving speeds, and different safe distances are also set for different moving modes. In a specific example, the safe distance is designed to be 350 at a low traveling speed, 450 at a medium traveling speed, 550 at a high traveling speed, 250 at a low rotating speed, 350 at a medium rotating speed, and 450 at a high rotating speed. A specific safe distance may be debugged according to site situations.

In addition, a safe car washing area may be alternatively set to set different active safety cases in this solution. In this case, the automatic car washing method further includes:

A car washing instruction is acquired, where the car washing instruction at least includes a cleaning position and corresponding cleaning duration; and A safe car washing area is set, where the safe car washing area is a car washing area selected for active safety;

The cleaning rack is moved to the corresponding cleaning position based on the car washing instruction, a distance between the cleaning rack and a side obstacle is acquired when the cleaning position is located in the safe car washing area, whether the distance is within a preset safe distance is determined, and movement of the cleaning rack is stopped if the distance is not within the safe distance; and The corresponding water sprayer and/or the corresponding car washing shampoo sprayer is opened in sequence based on the car washing instruction, and kept operation for the set cleaning duration under the condition that the distance is within the safe distance, and unopened water sprayers and/or car washing shampoo sprayers are kept closed.

The side obstacle includes but is not limited to a car, and the side obstacle may alternatively be a person or another obstacle between the car and the cleaning rack. In some embodiments, the safe car washing area may be set by shielding or unshielding a car washing area, and the car washing area does not serve as the safe car washing area any more after being shielded.

A specific operation is as follows. A user may set the safe car washing area on a mobile terminal. In this solution, the car washing area is divided into 9 square areas, and the user selects any or more car washing areas on the terminal as the safe car washing areas. Correspondingly, the to-be-washed car is subjected to active safety control after the cleaning rack is moved to the corresponding safe car washing area, and the car washing instruction is normally executed in other car washing areas that are not set to the safe car washing areas. It is certain that in some embodiments all car washing areas default to safe car washing areas according to this solution, but in specific car washing scenarios, for example, when the washing rack is quite close to a wall, the car washing areas may be shielded in order to avoid normal car washing procedures.

It is certain that the automatic car washing device according to this solution may implement not only active safety but also passive safety. In this case, currents on the first motor and the second motor according to this solution are directly read according to frequency converters.

Specifically, the automatic car washing method in this case includes the following steps:

A car washing instruction is acquired, where the car washing instruction at least includes a cleaning position and corresponding cleaning duration; and A cleaning rack is moved to a corresponding cleaning position based on the car washing instruction, a current on the first motor and/or the second motor is acquired, whether the current exceeds a preset safety range is determined, car washing is stopped under the condition that the current exceeds the safety range, the corresponding water sprayer and/or the corresponding car washing shampoo sprayer is opened in sequence based on the car washing instruction and kept operating for the set cleaning duration under the condition that the current does not exceed the safety range, and unopened water sprayers and/or car washing shampoo sprayers are kept closed.

That is, whether a fault occurs may be determined through the current on the first motor and the second motor in this solution, and car washing is stopped in time if the fault occurs, so as to avoid car washing accidents. In the step that "whether the current exceeds a preset safety range is determined", different safety ranges are set for car washing instructions of different modes, and the safety ranges are safety thresholds or change trends. A specific value may also be set and modified according to an actual car washing demand.

In this solution, whether the first motor and/or the second motor is obstructed when moving is determined by obtaining the current. Generally, if the first motor and/or the second motor are obstructed, the current rises sharply, and operation states of the first motor and the second motor may be determined based on the current and a change trend.

The automatic car washing method according to this solution implements comprehensive safety protection of unmanned car washing through two safety protection modes of active safety and passive safety, thereby ensuring that the unmanned car washing device may stop and keep a safe distance before touching an obstacle, and the passive safety may stop the device as soon as possible to reduce damage when the active safety fails or collision is caused in other circumstances.

It should be noted that technical content of Embodiment 1, Embodiment 2, Embodiment 3, and Embodiment 4 according to this solution may be implemented on the same automatic car washing device, or one thereof may be selected for the design of an automatic car washing device.

Embodiment 5

Figure 11:
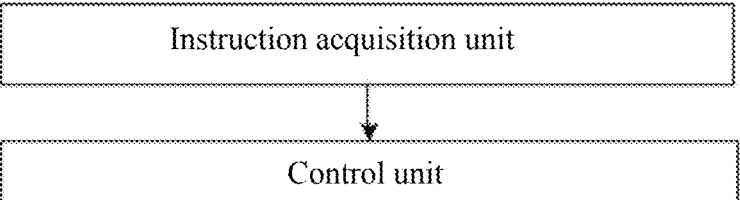
FIG. 11 is a schematic block diagram of an automatic car washing device according to this solution.

Based on the same idea, with reference to FIG. 11, the present application further provides an automatic car washing device based on the foregoing automatic car washing device. The automatic car washing device cleans a car body entering a car washing area, and includes:

an instruction acquisition unit configured to acquire a car washing instruction, where the car washing instruction at least includes a cleaning position and corresponding cleaning duration; and a control unit configured to move a cleaning rack to a corresponding cleaning position based on the car washing instruction, open a corresponding water sprayer and/or a corresponding car washing shampoo sprayer in sequence based on the car washing instruction, and keep same operating for set cleaning duration, and keep unopened water sprayers and/or car washing shampoo sprayers closed.

Embodiment 6

Figure 12:
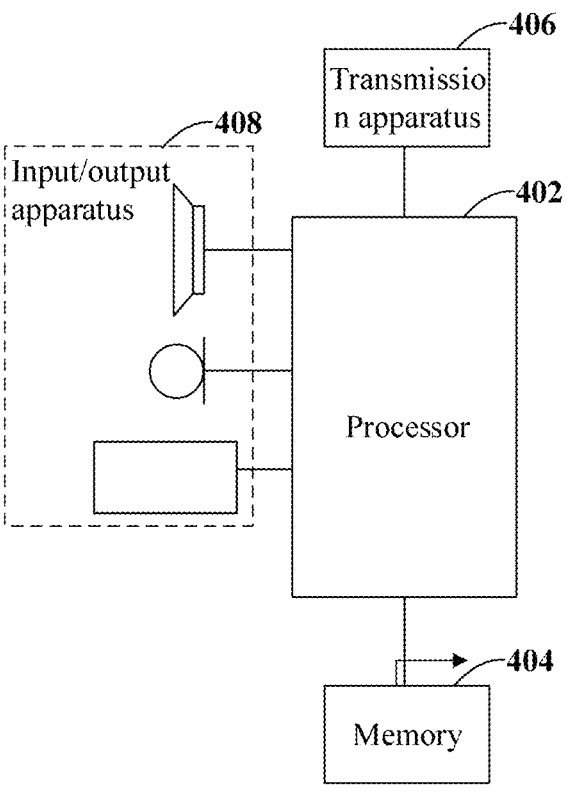
FIG. 12 is a schematic diagram of a hardware structure of an electronic apparatus according to an embodiment of the present application.

This embodiment further provides an electronic apparatus, with reference to FIG. 12, including a memory 404 and a processor 402. The memory 404 stores a computer program, and the processor 402 is configured to run the computer program to execute steps of the automatic car washing method in any of the foregoing embodiments.

Specifically, the processor 402 may include a central processing unit (CPU) or an application specific integrated circuit (ASIC), or may be configured to implement one or more integrated circuits according to the embodiment of the present application.

The memory 404 may include a mass memory 404 for data or instructions. By way of example and not limitation, the memory 404 may include a hard disk drive (HDD), a floppy disk drive, a solid state drive (SSD), a flash memory, an optical disk, a magneto-optical disk, a magnetic tape, or a universal serial bus (USB) drive, or a combination of two or more thereof. Where appropriate, the memory 404 may include a removable or non-removable (or fixed) medium. Where appropriate, the memory 404 may be arranged in or out of a data processing device. In a particular embodiment, the memory 404 is a non-volatile memory. In a particular embodiment, the memory 404 includes a read-only memory (ROM) and a random access memory (RAM). Where appropriate, the ROM may be a mask-programmed ROM, a programmable read-only memory (PROM), an erasable programmable read-only memory (EPROM), an electrically erasable programmable read-only memory (EEPROM), an electrically alterable programmable read-only memory (EAROM), or a flash memory, or a combination of two or more thereof. Where appropriate, the RAM may be a static random access memory (SRAM) or a dynamic random access memory (DRAM), where the DRAM may be a fast page mode dynamic random access memory 404 (FPMDRAM), an extended data out dynamic random access memory (EDODRAM), a synchronous dynamic random access memory (SDRAM), etc.

The memory 404 may be used for storing or caching various data files required for processing and/or communication and possible computer program instructions executed by the processor 402.

The processor 402 executes any of the automatic car washing methods in the foregoing embodiments by reading and executing the computer program instructions stored in memory 404.

Optionally, the electronic apparatus may further include a transmission device 406 and an input/output device 408, where the transmission device 406 is connected to the processor 402, and the input/output device 408 is connected to the processor 402.

The transmission device 406 may be used for receiving or sending data via a network. Specific examples of the network may include wired or wireless networks provided by a communication provider of the electronic apparatus. In an example, the transmission device includes a network interface controller (NIC) that may be connected to another network device through a base station to communicate with the Internet. In an example, the transmission device 406 may be a radio frequency (RF) module for wireless communication with the Internet.

The input/output device 408 is used for inputting or outputting information. In this embodiment, the input information may be various car washing instructions, etc. and the output information may be a car washing program, etc.

Optionally, in this embodiment, the processor 402 may be configured to execute the following steps through a computer program:

A car washing instruction is acquired, where the car washing instruction at least includes a cleaning position and corresponding cleaning duration; and A cleaning rack is moved to a corresponding cleaning position based on the car washing instruction, a corresponding water sprayer and/or a car washing shampoo sprayer is opened in sequence based on the car washing instruction, and kept operating for set cleaning duration, and unopened water sprayers and/or car washing shampoo sprayers are kept closed.

It should be noted that reference may be made to the examples described in the foregoing embodiments and optional implementations for the specific examples in this embodiment, which are not repeated herein in this embodiment.

Generally, various embodiments may be implemented in hardware, dedicated circuitry, software, logic, or any combination thereof. Some aspects of the present invention may be implemented in hardware, while other aspects may be implemented in firmware or software that may be executed by a controller, a microprocessor, or another computing devices, but the present invention is not limited thereto. Although various aspects of the present invention may be shown and described as block diagrams, flowcharts, or employ some other diagrams, it should be understood that the blocks, devices, systems, technologies, or methods described herein may be implemented in hardware, software, firmware, dedicated circuitry or logic, general-purpose hardware or controller, or another computing device, or a combination thereof, as non-limiting examples.

The embodiments of the present invention may be implemented by computer software, and the computer software is executable by a data processor of a mobile device, such as in a processor entity, or implemented by hardware or a combination of software and hardware. Computer software or programs (also referred to as program products) including software routines, applets, and/or macros may be stored in any device-readable data storage medium, and include program instructions for executing specific tasks. The computer program product may include one or more computer executable assemblies configured to execute embodiments when the program is run. The one or more computer executable assemblies may be at least one software code or a portion thereof. At this point, it should be noted that any block of the logic flow as shown in the figures may represent a program step, or an interconnected logic circuit, block and function, or a combination of the program step and the interconnected logic circuit, block and function. The software may be stored in a physical medium such as a memory chip or a memory block implemented in a processor, a magnetic medium such as a hard disk or a floppy disk, and an optical medium such as a DVD and data variants thereof, and a CD. The physical medium is a non-transient medium.

Those skilled in the art should understand that the technical features of the foregoing embodiments can be combined randomly. For the purpose of simplicity in description, all possible combinations of the technical features in the foregoing embodiments are not described. However, as long as the combinations of these technical features do not have contradictions, they shall fall within the scope of the description.

The foregoing embodiments only describe several implementations of the present application, and their descriptions are specific and detailed, but cannot therefore be understood as limitation to the scope of the present application. It should be noted that those of ordinary skill in the art can further make several variations and improvements without departing from the conception of the present application, and these variations and improvements shall fall within the protection scope of the present application. Therefore, the protection scope of the present application should be subject to the appended claims.

What is claimed is:

1. An automatic car washing method, comprising:
providing an automatic car washing device comprising a guide rail device, a translation rack connected to the guide rail device in a sliding manner, a cleaning rack mounted on the translation rack in a hanging down manner, a drive wheel connected to the translation rack, a drive assembly, and guide wheels; the drive wheel is in contact with a surface of the guide rail device, the drive assembly is capable of driving the drive wheel to move along the guide rail device, and the guide wheels are in contact with sides of the guide rail device and configured for guiding movement of the translation rack along the guide rail device, the cleaning rack comprises a plurality of cleaning segments arranged in different directions, the cleaning segments are in communication with each other through a single water pipe, the cleaning rack is provided with a plurality of independently controlled water sprayers arranged at different positions and independently controlled car washing shampoo sprayers configured to spray shampoo, wherein at least one of the independently controlled water sprayers is arranged on each of the cleaning segments, wherein the cleaning segments include a horizontal segment, an oblique segment and a vertical segment, wherein the water sprayers include at least a top water sprayer, an oblique water sprayer and a lower water sprayer respectively arranged on the horizontal segment, the oblique segment and the vertical segment, and wherein the water sprayers are not configured to spray the shampoo sprayed by the car washing shampoo sprayers;
entering a car into a washing area of the automatic car washing device;
acquiring a car washing instruction, wherein the car washing instruction at least comprises a cleaning position and corresponding cleaning duration;
driving the translation rack to move along the guide rail device using the drive assembly, and sensing marker baffles on the guide rail using an infrared sensor, thereby moving the cleaning rack to the cleaning position based on the car washing instruction; and
after the cleaning rack has moved to the corresponding cleaning position, spraying water from one of the water sprayers based on the car washing instruction while a group of the water sprayers remain closed or spraying shampoo from one of the shampoo sprayers while a group of the shampoo sprayers remain closed.

2. The automatic car washing method according to claim 1, wherein the car washing instruction comprises a set car washing procedure, the set car washing procedure comprises sequential cleaning positions and a cleaning duration for each cleaning position.

3. The automatic car washing method according to claim 1, wherein the car washing instruction comprises a user selected car washing procedure, the car washing procedure comprises a user set cleaning position and a corresponding cleaning duration, and an opening time of each water sprayer and/or car washing shampoo sprayer is set according to the car washing procedure.

4. The automatic car washing method according to claim 1, wherein in the step of "acquiring a car washing instruction, wherein the car washing instruction at least comprises a cleaning position and corresponding cleaning duration", the cleaning position comprises a car dirt position, the corresponding cleaning duration is a dirt cleaning duration, and the dirt cleaning duration is longer than cleaning durations of other positions.

5. The automatic car washing method according to claim 4, wherein a car dirt identification camera is arranged on a side of the automatic car washing device to acquire an image of a to-be-washed car, a target detection model is trained through an image with marked car dirt to obtain a car dirt identification model, and the image, acquired by the car dirt identification camera, of the to-be-washed car is input into the car dirt identification model to obtain the car dirt position.

6. The automatic car washing method according to claim 4, wherein a car dirt identification camera is arranged on a side of the automatic car washing device to acquire an image of a to-be-washed car, a target detection model is trained through an image with car dirt and a dirt area marked to obtain a car dirt identification model, and the image, acquired by the car dirt identification camera, of the to-bewashed car is input into the car dirt identification model to obtain the car dirt position and a degree of dirt.

7. The automatic car washing method according to claim 1, comprising: acquiring a distance between the cleaning rack and a to-be-washed car, determining whether the distance is within a preset safe distance, stopping movement of the cleaning rack under the condition that the distance is not within the safe distance, or opening a water sprayer and/or a car washing shampoo sprayer in sequence based on a car washing instruction.

8. The automatic car washing method according to claim 7, wherein a distance sensor is arranged at a bottom of the cleaning rack.

9. The automatic car washing method according to claim 7, wherein the preset safe distance is selected in a mode based on a cleaning instruction.

10. The automatic car washing method according to claim 7, comprising: setting a safe car washing area, wherein the safe car washing area is a car washing area selected for active safety; moving the cleaning rack to a cleaning position based on a car cleaning instruction.

11. The automatic car washing method according to claim 1, comprising: moving the cleaning rack to a cleaning position based on a car washing instruction, acquiring a current of a first motor or a second motor, determining whether the current exceeds a preset safety range, stopping car washing under the condition that the current exceeds the safety range, or keeping a water sprayer and/or a car washing shampoo sprayer operating for a cleaning duration under the condition that the current does not exceed the safety range.

12. An automatic car washing method, comprising:

providing an automatic car washing device comprising a guide rail device and a cleaning rack movably arranged on the guide rail device, the cleaning rack comprises a plurality of cleaning segments arranged in different directions, the cleaning segments are in communication with each other through a single water pipe, the cleaning rack is provided with a plurality of independently controlled water sprayers arranged at different positions and independently controlled car washing shampoo sprayers configured to spray shampoo, at least one independently controlled water sprayer is arranged on each of the cleaning segments, a bottom of the cleaning rack is provided with a car hub cleaning nozzle, wherein a car hub cleaner delivery device is connected to the car hub cleaning nozzle through a supply line, and the supply line and the single water pipe are arranged independently, wherein the cleaning segments include a horizontal segment, an oblique segment and a vertical segment, wherein the water sprayers include at least a top water sprayer, an oblique water sprayer and a lower water sprayer respectively arranged on the horizontal segment, the oblique segment and the vertical segment, and wherein the water sprayers are not configured to spray the shampoo sprayed by the car washing shampoo sprayers;

entering a car into a washing area of the automatic car washing device;

acquiring a car washing instruction, wherein the car washing instruction at least comprises a cleaning position and corresponding cleaning duration;

acquiring a car hub image and identifying the hub based on the car hub image by using a hub identification computer model;

moving the cleaning rack in translation along the guide rail device to the cleaning position based on the car washing instruction using an infrared sensor sensing marker baffles on the guide rail device, thereby moving the cleaning rack to the cleaning position; and opening the hub cleaning nozzle such that the hub cleaner is sprayed onto the identified hub of the car, and wherein the water sprayers and the shampoo sprayers are not configured to spray the hub cleaner.

13. The automatic car washing method according to claim 12, wherein the car hub image is acquired through a hub identification camera arranged on the automatic car washing device, and the car hub image at least comprises a car hub.

14. The automatic car washing method according to claim 13, wherein a vertical distance between the cleaning rack and the hub is computed based on an angle of view of the hub identification camera and a horizontal distance between the cleaning rack and a car body through a trigonometric function, and the hub cleaning nozzle of the cleaning rack is moved to a cleaning position opposite the hub.

15. The automatic car washing method according to claim 12, comprising: setting a safe car washing area, wherein the safe car washing area is a car washing area selected for active safety, and when a cleaning position is located in the safe car washing area, acquiring a distance between the washing rack and a to-be-washed car, and determining whether the distance is within a preset safe distance.

16. The automatic car washing method according to claim 12, comprising: acquiring a distance between the cleaning rack and a to-be-washed car, determining whether the distance is within a preset safe distance, stopping movement of the cleaning rack under the condition that the distance is not within the safe distance, or opening a water sprayer and/or a car washing shampoo sprayer for a cleaning duration under the condition that the distance is within the safe distance.

17. The automatic car washing method according to claim 12, comprising: moving the cleaning rack to a cleaning position based on a car washing instruction, acquiring a current of a first motor or a second motor, determining whether the current exceeds a preset safety range, stopping car washing under the condition that the current exceeds the safety range, or operating a water sprayer and/or a car washing shampoo sprayer for a cleaning duration under the condition that the current does not exceed the safety range.

* * * * *